US008897348B2

(12) United States Patent
Cahill

(10) Patent No.: US 8,897,348 B2
(45) Date of Patent: Nov. 25, 2014

(54) NARROWBAND DIAGNOSTICS FOR TWISTED PAIR WIRING

(75) Inventor: Christopher William Cahill, Northborough, MA (US)

(73) Assignee: Aware, Inc., Bedford, MA (US)

(*) Notice: Subject to any disclaimer, the term of this patent is extended or adjusted under 35 U.S.C. 154(b) by 156 days.

(21) Appl. No.: 13/202,327

(22) PCT Filed: Feb. 9, 2010

(86) PCT No.: PCT/US2010/023536
§ 371 (c)(1),
(2), (4) Date: Aug. 18, 2011

(87) PCT Pub. No.: WO2010/091379
PCT Pub. Date: Aug. 12, 2010

(65) Prior Publication Data
US 2012/0027067 A1  Feb. 2, 2012

Related U.S. Application Data

(60) Provisional application No. 61/150,974, filed on Feb. 9, 2009.

(51) Int. Cl.
*H04B 3/46* (2006.01)
*H04B 17/00* (2006.01)
*H04Q 1/20* (2006.01)

(52) U.S. Cl.
USPC ....... 375/224; 375/355; 379/1.04; 379/22.02; 379/22.07; 379/24; 379/30

(58) Field of Classification Search
CPC  H04M 3/305; H04L 12/2697; H03H 17/0621
USPC .......... 375/224, 355; 379/1.04, 22.02, 22.07, 379/24, 30, 32.02, 399.01; 324/637, 601
See application file for complete search history.

(56) References Cited

U.S. PATENT DOCUMENTS 5,404,401 A    4/1995  Bliven et al.
5,408,497 A  * 4/1995  Baumann et al. ............. 375/219
(Continued)

OTHER PUBLICATIONS

International Preliminary Report on Patentability for International application No. PCT/US2010/023536, dated Aug. 9, 2011.

*Primary Examiner* — Sam K Ahn
*Assistant Examiner* — Fabricio R Murillo Garcia
(74) *Attorney, Agent, or Firm* — Schmeiser, Olsen & Watts LLP; Michael Rodriguez

(57) ABSTRACT

A test system for diagnosing twisted pair wiring includes a system processor in communication with a subscriber line interface module, which includes a codec and a SLIC (Subscriber Line Interface Circuit). The SLIC transmits a waveform having a frequency used for voice or baseband modem transmissions onto the twisted pair wiring. The system processor transmits a digital PCM (Pulse Code Modulation) stream to the codec, and the codec converts the digital PCM stream into the waveform transmitted onto the twisted pair wiring. In response to the transmitted waveform, the SLIC senses current on the twisted pair wiring. The codec generates an output waveform corresponding to the sensed current. The system processor receives the output waveform from the codec as a digital PCM stream, synchronizes the transmitted waveform and the output waveform at a single sample, and determines electrical properties of the twisted pair wiring from the output waveform.

19 Claims, 8 Drawing Sheets

(56) References Cited

U.S. PATENT DOCUMENTS

| | | | |
|---|---|---|---|
| 6,389,109 B1 * | 5/2002 | Schmidt et al. | 379/1.04 |
| 6,819,745 B2 | 11/2004 | Hollenbeck et al. | |
| 6,842,012 B2 * | 1/2005 | Belge et al. | 324/637 |
| 2002/0181697 A1 * | 12/2002 | Bolla et al. | 379/399.01 |
| 2002/0196908 A1 * | 12/2002 | Hollenbeck et al. | 379/1.04 |
| 2003/0053553 A1 * | 3/2003 | Critchlow et al. | 375/295 |
| 2003/0138082 A1 | 7/2003 | Lari et al. | |
| 2004/0218583 A1 * | 11/2004 | Adan et al. | 370/352 |
| 2004/0240663 A1 * | 12/2004 | Lomax et al. | 379/399.01 |
| 2006/0023821 A1 * | 2/2006 | Barnette et al. | 375/355 |

* cited by examiner

NARROWBAND DIAGNOSTICS FOR TWISTED PAIR WIRING

RELATED APPLICATION

This application claims the benefit of U.S. Provisional Application Ser. No. 61/150,974, filed Feb. 9, 2009, titled "Narrowband Diagnostics using CODEC/SLIC with PCM Highway," the entirety of which provisional application is incorporated by reference herein.

FIELD OF THE INVENTION

The invention relates generally to narrowband diagnostics of twisted-pair wiring. More specifically, the invention relates to characterizing twisted-pair wiring at frequencies used by voice and baseband modem transmissions.

BACKGROUND

Resistance and capacitance of a twisted pair wiring (or telephone line) have long been known to be important electrical properties that affect communications carried by that line. Such electrical properties can also serve to provide indications of line faults, which can arise for numerous causes, such as moisture, physical damage, and power surges. Accordingly, industry has devised various techniques for measuring the electrical properties of twisted pair wiring in order to determine whether certain electrical properties of the line, in particular, its capacitance and resistance, are within acceptable values.

SUMMARY

In one aspect, the invention features a method for diagnosing twisted pair wiring. An input waveform is transmitted onto twisted pair wiring. The input waveform has a frequency less than or equal to 20 kHz. An output waveform corresponding to current sensed is generated in response to transmitting the input waveform over the twisted pair wiring. Electrical properties of the twisted pair wiring are determined from the output waveform.

In another aspect, the invention features an apparatus for diagnosing twisted pair wiring. The apparatus comprises a SLIC (Subscriber Line Interface Circuit), a codec and a system processor. The SLIC is capable of transmitting a waveform having a frequency less than or equal to 20 kHz onto the twisted pair wiring and capable of sensing current on the twisted pair wiring in response to the transmitted waveform. The codec is capable of generating an output waveform corresponding to the sensed current, and the system processor is capable of determining electrical properties of the twisted pair wiring from the output waveform.

In still another aspect, the invention features an apparatus for diagnosing twisted pair wiring. The apparatus comprises a transmitter, receiver, and system processor. The transmitter is capable of sending a sinusoidal input signal onto twisted pair wiring. The receiver is capable of generating a sinusoidal output signal corresponding to current sensed in response to transmitting the input signal over the twisted pair wiring, and the processor is capable of determining resistance and capacitance of the twisted pair wiring based on the output signal.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Narrowband diagnostics, as used herein, refers to the analysis of twisted pair wiring at frequencies used for voice (up to approximately 4 kHz) and baseband modem transmissions (typically, less than or equal to 8 kHz, ranging up to approximately 20 kHz). Test systems, methods, and protocols performing narrowband diagnostics transmit a sinusoidal signal with one or more of such voice or baseband modem frequencies over twisted pair wiring. Electrical properties of the twisted pair wiring are determined from a current signal received in response to the transmitted sinusoidal signal.

In one embodiment, a test system utilizes a telephony codec and SLIC (Subscriber Line Interface Circuit) for the measurement of the electrical properties of the twisted pair wiring. A system processor of the test system manages the measurement process through a pair of interfaces: a management interface by which the system processor initializes and controls the SLIC; and a PCM (pulse code modulation) interface by which the system processor streams audio data to and from the phone line.

Through the PCM interface, the system processor plays out audio data, corresponding to an input waveform, to the codec and SLIC. In response to the audio data, the SLIC sources a sinusoidal signal onto the phone line, while concurrently measuring the resulting line current. From the resulting signal, the codec uses a lock-in amplifier to extract a signal at a reference frequency, while rejecting signals at frequencies other than the reference frequency. As a result, the lock-in amplifier effectively filters out noise signals and avoids introducing DC error currents into the resistance and capacitance measurements.

The codec converts the extracted signal into an output waveform, which the system processor receives through the PCM interface, records in memory, and synchronizes, to a single A/D (analog/digital) sample, with the input waveform. The system processor determines the resulting phase of the load, from which the resistance and capacitance are determined.

Because the test system 10 uses standard voice telephony devices (i.e., the codec and SLIC), various voice applications can be added to the test system, to add thereby voice-transmission features to the narrowband diagnostics functionality.

These include battery generation, ring signal generation, off-hook indication, DTMF generation, and voice transmission and reception.

Figure 1:
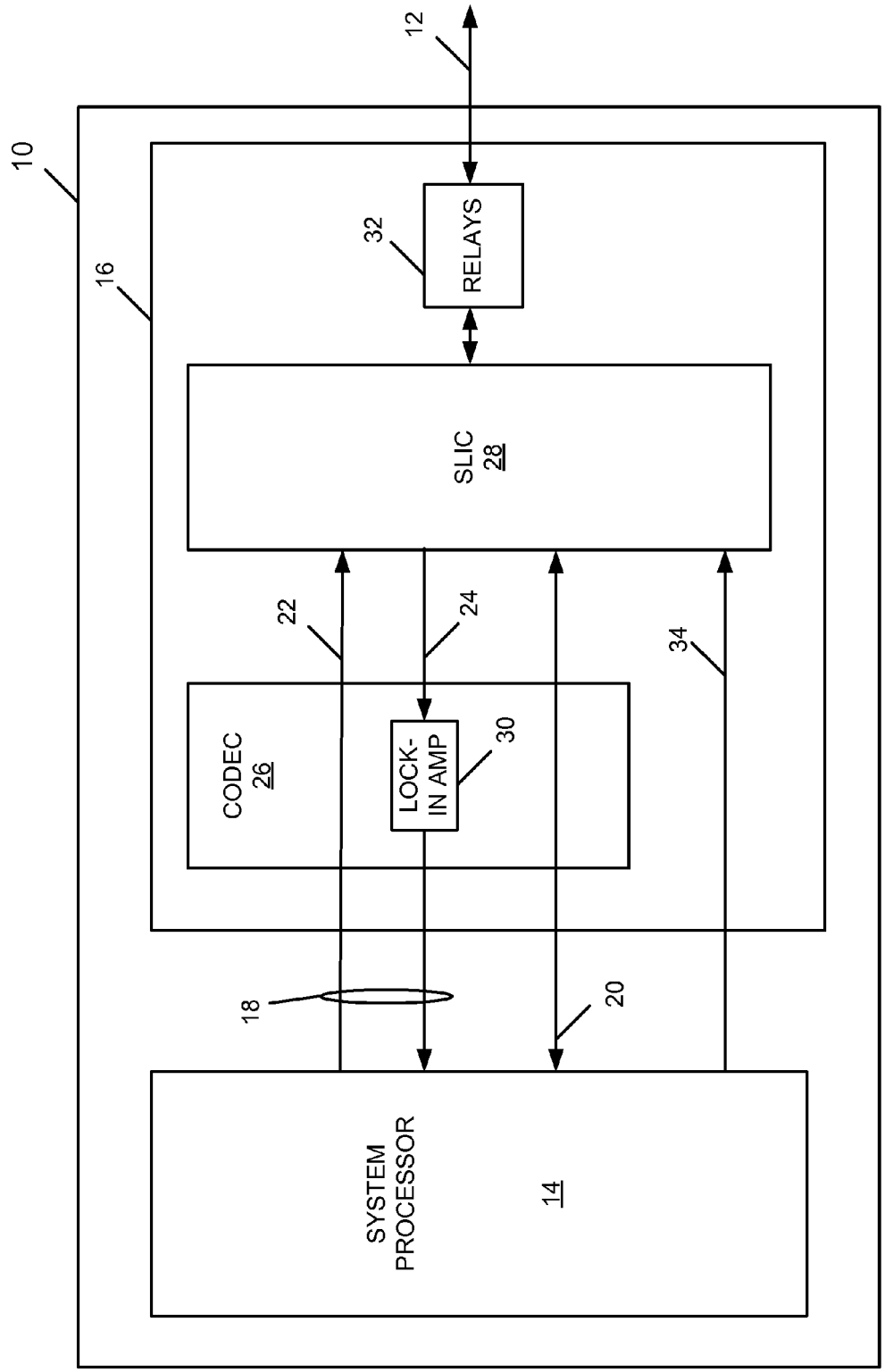
FIG. 1 is a diagram of an embodiment of test system for characterizing twisted pair wiring at frequencies used for voice and baseband modem transmissions.

FIG. 1 shows an embodiment of a test system 10 for characterizing twisted pair wiring 12 (also referred to as a phone line or subscriber line), which can be deployed at a central office. The test system 10 includes a system processor 14 in communication with a subscriber line interface module 16 over a PCM bus 18 and a management bus 20. In general, the system processor manages the diagnostics of the phone line over the PCM and management busses. The PCM bus 18 includes a transmit path 22 and a receive path 24 by which the system processor 14 streams digital PCM data to and from the phone line. Over the management bus 20, the system processor initializes and controls the subscriber line interface module.

In one embodiment, the subscriber line interface module 16 includes a codec 26 in communication with a subscriber line interface circuit (SLIC) 28. The codec 26 provides digital-to-analog (D/A) conversion of signals traversing the transmit path 22 from the system processor 14 to the phone line, and analog-to-digital (A/D) conversion of signals traversing the receive path 24 from the phone line to the system processor 14. In one embodiment, the codec 26 is a telephony codec that uses a sampling rate of 16 kHz and encodes each value for a sample in 16 bits. The 16 kHz sample rate and 16-bit sample size advantageously produces better accuracy and resolution than using an 8 kHz sample rate and an 8-bit sample size, although the lesser rate and smaller bit size can be practiced without departing from the principles described herein.

The codec 26 includes a lock-in amplifier 30 for extracting a small signal at a known reference frequency, provided by the system processor, from a noisy environment. Disposed in the receive path 24 between the SLIC 28 and the system processor 14, the lock-in amplifier 30 rejects (noise) signals at frequencies other than the reference frequency. In other embodiments, the lock-in amplifier can be configured to extract signals at multiple different frequencies from the signal on the receive path.

The SLIC 28 is in communication with the phone line 12 through a set of measurement relays 32 used to selectively produce electrical communication between any two of the tip wire, the ring wire, and ground of the phone line 12. In one embodiment, the system processor 14 sets the measurement relays 32 to the desired test state indirectly by manipulating registers of the SLIC over signal bus 34. In an alternative embodiment (not shown), the system processor 14 can communicate directly with the measurement relays to establish the desired test state.

Voltage level meter and programmable voltage sources integrated into the SLIC are used to source a signal onto the phone line 12, while concurrently measuring the resulting line current. As described herein, from the measured line current are derived the resistance and capacitance of the phone line. In one embodiment, the SLIC 28 and codec 26 are implemented in a single chipset, e.g., the DuSLIC-E2 chipset is composed of a SLIC, PEB3265, and a CODEC, PEB4265-2. The DuSLIC-E2 is manufactured by Lantiq of Neubiberg, Germany, (Formerly, Infineon Technologies AG, of Munich, Germany)

In addition, the codec 26 has a digital loopback mode. When loopback is enabled, a waveform transmitted from system processor to the codec is returned by the codec to the system processor without passing to the phone line. As described herein, the test system uses the loopback mode of the codec to determine a sample delay between the transmit path 22 and receive path 24.

Figure 2:
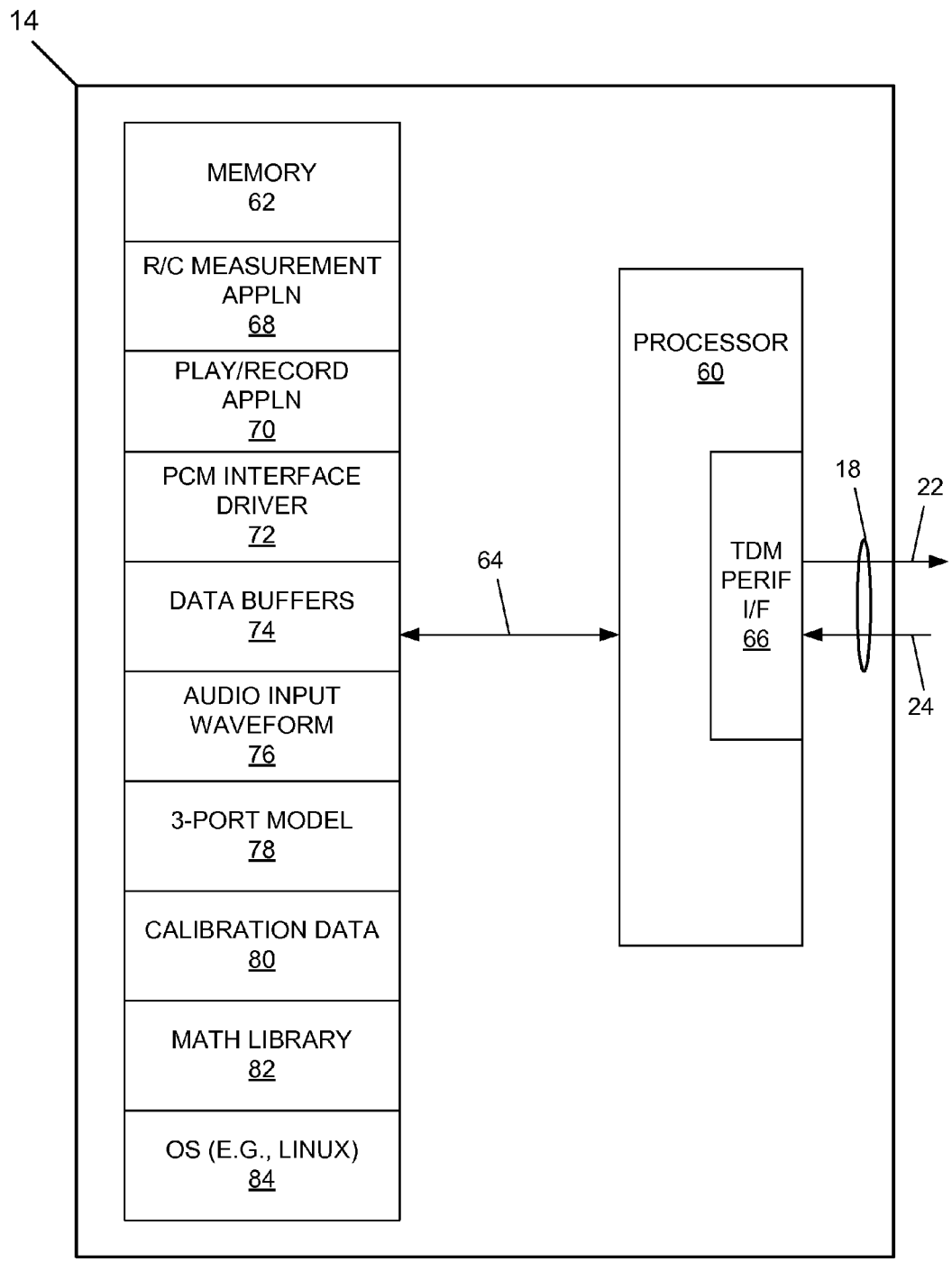
FIG. 2 is a block diagram of an embodiment of a system processor for conducting narrowband diagnostics.

FIG. 2 shows an embodiment of the system processor 14 including a processor 60 in communication with memory 62 over a communication bus 64. In general, the processor 60 is any computing entity capable of running application code and communicating PCM data to and from the subscriber line interface module. Example implementations of the processor 60 include, but are not limited to, a microprocessor, a central processing unit (CPU), a microcontroller, Field Programmable Gate Array (FPGA), finite state machine, custom logic, and any combination thereof. In one embodiment, the processor 60 is implemented with an MPC8271 Integrated Communications Processor manufactured by Freescale Semiconductor of Austin, Tex.

Streaming PCM data directly between the processor 60 and the subscriber line interface module 16 uses a TDM (time domain multiplexing) peripheral interface 66 of the processor. The TDM peripheral interface 66 includes a pair of TDM ports and a plurality of peripherals (e.g., SMC1, SCC1), and is capable of processing a serial data stream from multiple sources and of routing each individual data stream from a given source to a selected peripheral in the processor 60.

As described herein, the TDM peripheral interface 66 is configured to route a single PCM data stream from the processor 60 to the SLIC 28 over a PCM transmit signal line (i.e., transmit path 22), and to route a single PCM data stream from the SLIC 28 to a select peripheral (e.g., the SMC1 peripheral) for processing over a PCM receive signal line (i.e., receive path 24). Other signal lines of the PCM interface bus 18 between the processor 60 and the subscriber line interface module 16 include an input clock signal line and a PCM frame sync signal line. One clock signal line and one frame sync signal line are sufficient to synchronize transmitting and receiving PCM data.

The memory 62 stores program code and data, including an application 68 for measuring resistance and capacitance, an PCM interface application 70 for playing and recording data streams, a PCM interface driver 72 for spawning playback and record threads, data buffers 74, an audio file 76 to be played out to the subscriber line interface module, a 3-port model 78 of the subscriber line interface module, a file containing calibration data 80, math library routines 82, and an operating system 84 (e.g., Linux). Examples of storage media for implementing the memory 62 include, but are not limited to, volatile storage media (e.g., dynamic random access memory (DRAM) and static RAM), with non-removable and removable non-volatile storage (e.g., FLASH, EEPROM, hard disks, USB memory sticks, optical disks such as CD ROMs, magnetic diskettes, and flash memory cards), or any combination thereof.

Figure 3:
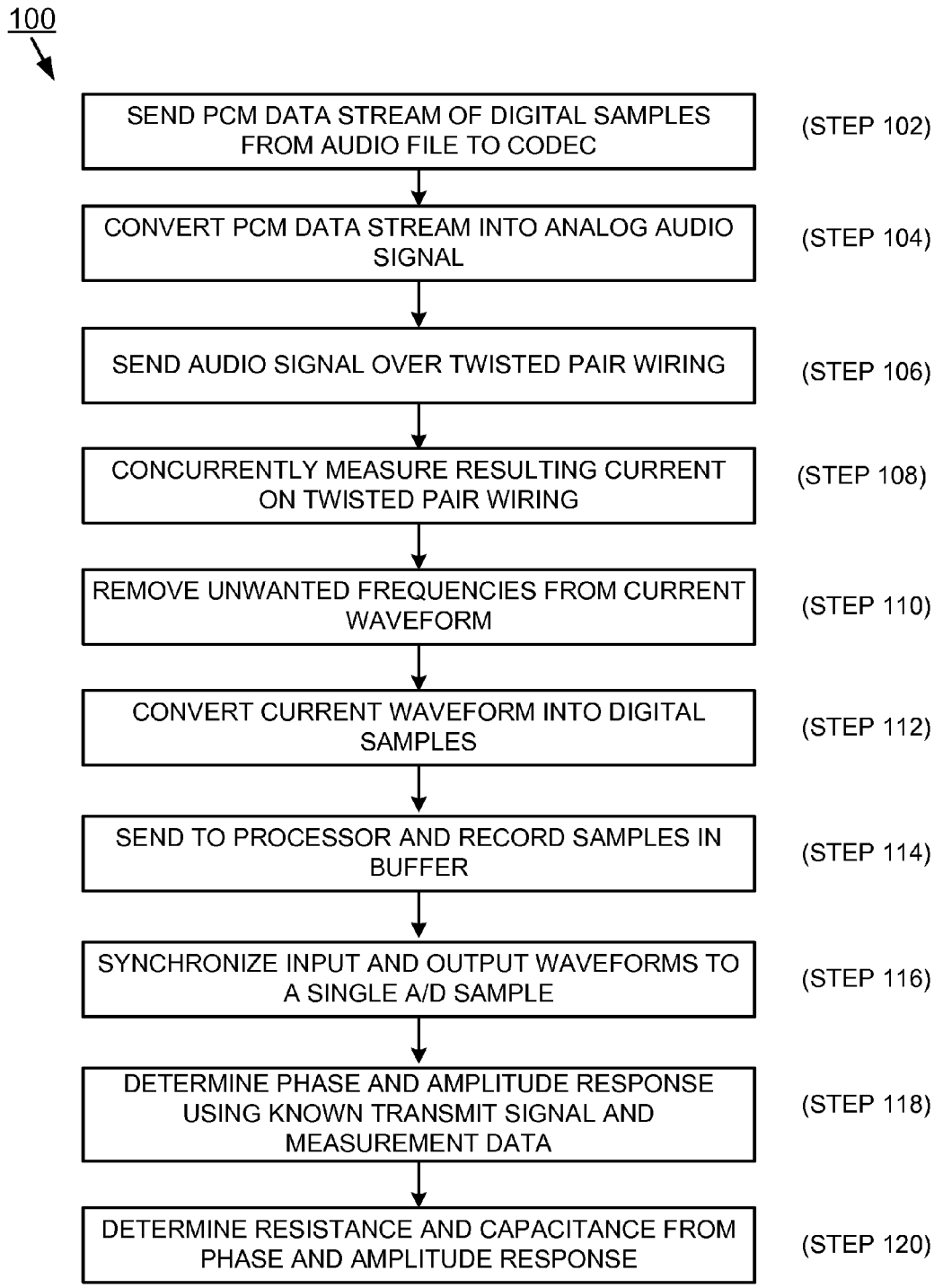
FIG. 3 is a flow diagram of an embodiment of a process for characterizing twisted pair wiring.

FIG. 3 provides a brief overview of an embodiment of process 100 for characterizing twisted pair wiring. In the description of the process, reference is also made to elements of FIG. 1 and FIG. 2. At step 102, the processor 60 sends a PCM data stream of digital samples (from the audio data file 76) to the codec 26 over the transmit path 22 of the PCM bus 18. The codec converts (step 104) the PCM data stream into a low voltage sinusoidal audio signal and sends the audio signal to the SLIC 28. In one embodiment, the waveform of the audio signal contains one or more frequencies in the voice band, below 4 kHz. In other embodiments, a frequency carried by the audio signal can be as high as 8 kHz.

The SLIC 28 amplifies and transmits (step 106) the audio signal over the twisted wire pair and concurrently measures (step 108) the resulting current on the twisted pair wiring. The lock-in amplifier 30 of the codec removes (step 110) unwanted frequencies from the current waveform and extracts a signal at a known reference frequency. The codec converts (step 112) the analog current waveform into digital sample values, and sends the sample values to the processor over the receive path 24; the received samples are recorded (step 114) in data buffers 74.

Based on the sample values stored in the data buffers, the processor synchronizes (step 116) the input waveform (i.e., transmitted audio file) to the output waveform (received measured waveform) to a single A/D sample (i.e., the start of the measurement data for a given frequency in the input waveform). After the waveforms are synchronized, the processor 60 can then determine (step 118) a phase and amplitude response from the measurement data. From the phase and amplitude response information, the processor determines (step 120) the resistance and capacitance of the twisted pair wiring (the resistance being proportional to in-phase (real) component and the capacitance being proportional to the quadrature (imaginary) component of the measured waveform).

Figure 4A:
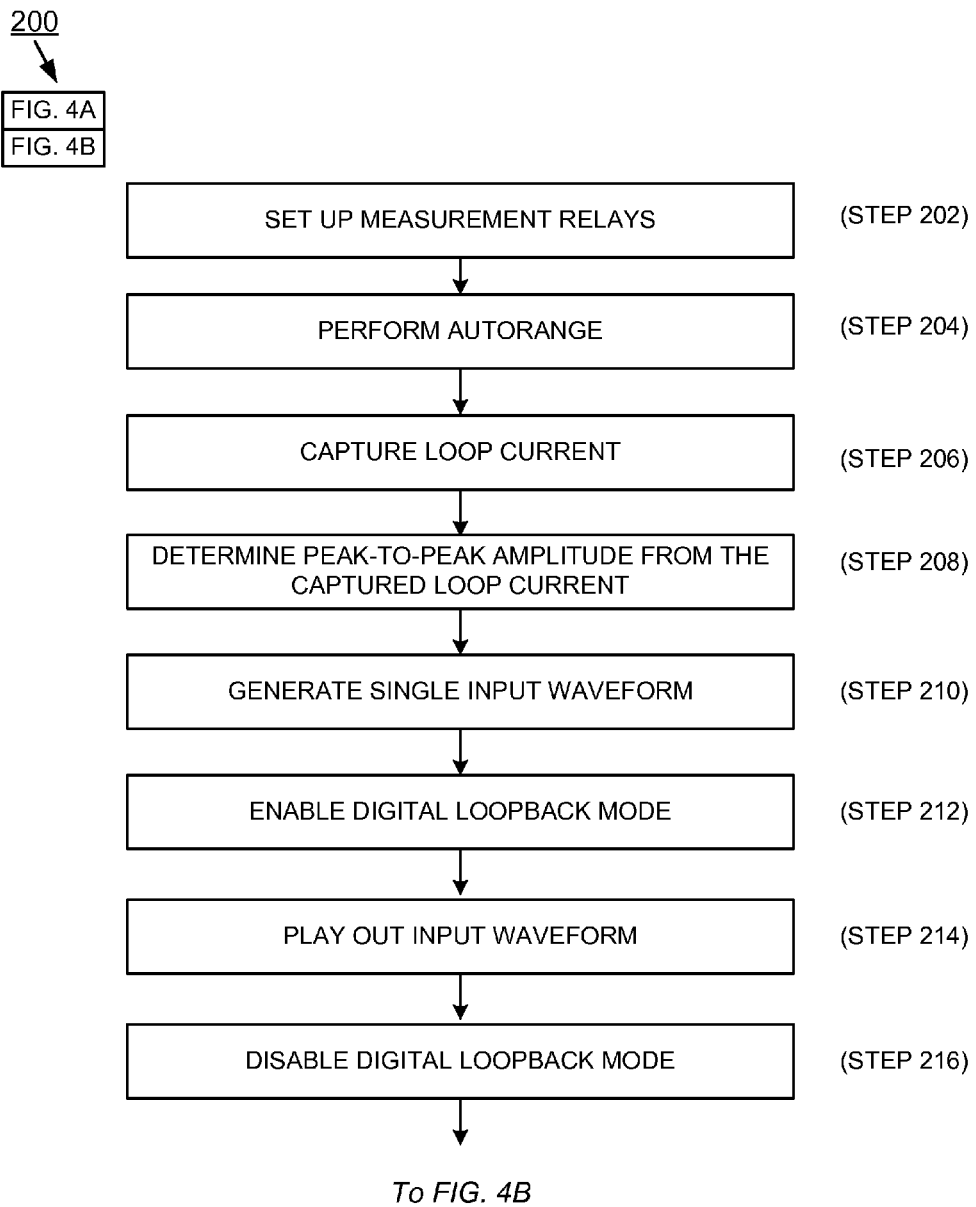
FIG. 4A and FIG. 4B are a flow diagram of an embodiment of a process for measuring resistance and capacitance of twisted pair wiring.
Figure 4B:
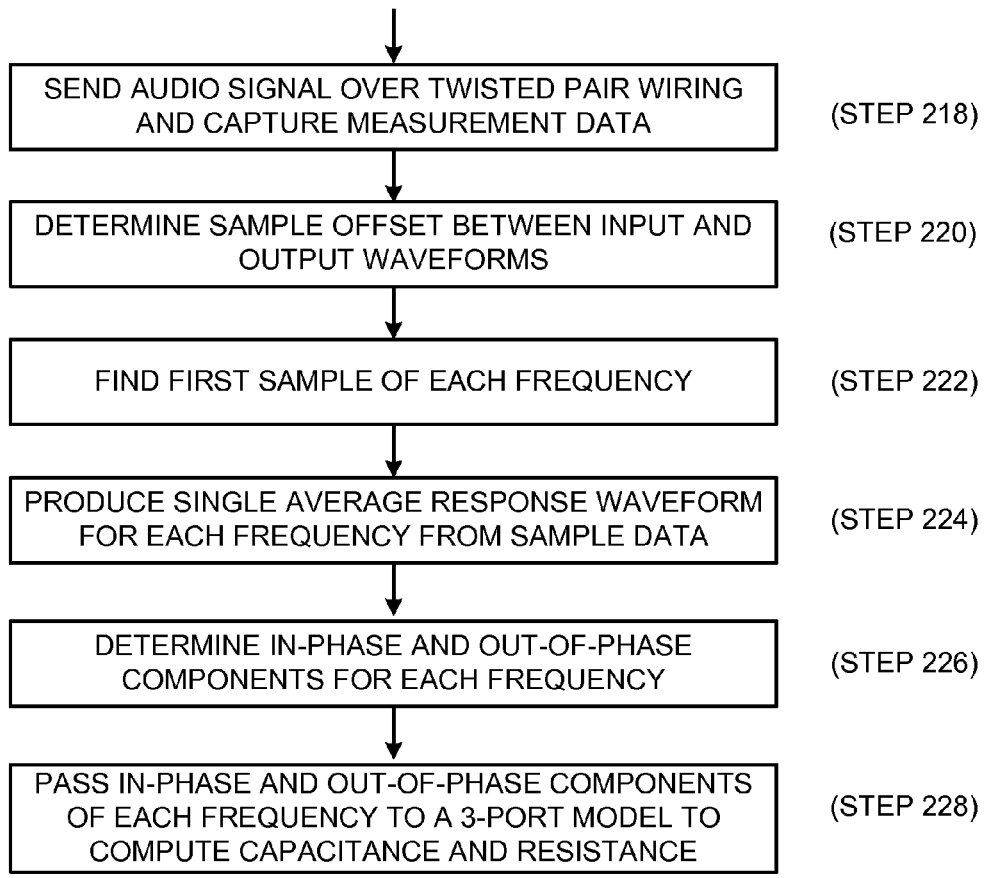

FIG. 4A and FIG. 4B provide an embodiment of a process 200 for measuring resistance and capacitance of twisted pair wiring. In brief overview of the process 200, the processor 60 executes the resistance/capacitance (R/C) measurement application 68 to start the measurement process. Execution of the R/C measurement application 68 spawns a playback thread to stream the test waveform to the subscriber line interface module 16 and a record thread for capturing an audio buffer of measured audio data. The processor then processes and passes the audio data in the audio buffer to the 3-port model 78 of the system. Through use of the 3-port model 78 and calibration parameters, the processor computes the resistance and capacitance of the phone line from the audio data.

Before starting the measurement process, the processor 60 communicates (step 202) with the codec 26 to indirectly use general purpose interface pins to set the measurement relays 32 to a desired state (which can be any one of a tip-ring, tip-ground, or ring-ground configuration). After the relays are set, the processor 60 performs (step 204) an autorange by sending out a sinusoidal signal to the SLIC 28 and capturing (step 206) the resulting loop current (i.e., the autorange response) in a data buffer 74. In one embodiment the sinusoidal signal is a 500 Hz, 0.1 second duration sine wave of 1/10 full scale. The amplitude of this autorange source signal is chosen so as not to produce a clipped response, even if the signal drives into a short circuit (on the line).

The processor parses the buffer containing the signal waveform corresponding to the captured loop current to determine (step 208) its peak-to-peak amplitude. The maximum amplitude of the input waveform used to perform subsequent resistance and capacitance measurements takes into account the maximum amplitude of this autorange response. Based on this measured autorange amplitude, one or more desired measurement frequencies and measurement time for each frequency, the R/C measurement application 68 generates (step 210) a single input waveform and saves the waveform to the audio input waveform file 76. Through the R/C measurement application 68, an operator selects the desired frequencies and duration of each measurement. When generating the input waveform, the R/C measurement application 68 places a sync buffer at the beginning of the waveform, a buffer before each individual frequency in the waveform, and another buffer after each individual frequency, to allow time for the waveform to settle before data for that frequency is parsed (later, by the processor) for analysis.

For example, consider that an operator wants to characterize twisted pair wiring at two frequencies, 62.5 Hz and 125 Hz, for two seconds at each frequency. The R/C measurement application 68 produces the following:

The waveform begins with 256 samples comprised of zeros for measuring sync offset, followed by 16640 delay samples needed before loopback can be disabled. After the delay samples comes a pre-buffer of 256 samples to allow the 62.5 Hz signal to settle, followed by 32000 samples (16000 samples per second for 2 seconds) of 62.5 Hz data, which are followed by a post-buffer of 256 samples. After the 62.5 Hz samples, the waveform continues with the 125 Hz signal: a pre-buffer of 256 samples to allow the 125 Hz waveform to settle, followed by 32,000 samples of 125 Hz data, which are followed by a post-buffer of 256 samples. In this example waveform, the two different frequencies are sent serially. Other waveforms can send multiple frequencies at the same time (this could produce a reduction in measurement time).

Before starting the resistance/capacitance measurement process, the processor enables (step 212) the digital loopback in the codec 26. The loopback is used to determine the delay (in number of samples) between the transmit channel and the receive channel of the PCM interface driver 72. Knowing this delay (referred to as offset samples) ensures that the playback (input) and record (output) waveforms can be synced to a single sample in order to get accurate measurement results. After turning on the loopback mode, the processor 60 opens the TDM peripheral interface 66 in playback and record mode and plays out (step 214) the generated input waveform through the PCM interface.

Concurrent with streaming the samples of the input waveform to the subscriber line interface module, the processor 60 receives and records an incoming PCM data stream in the data buffers. After receiving, recording, and receiving a full first data buffer, the processor 60 disables (step 216) the loopback mode of the codec. The delay of 16640 samples placed early in the generated input waveform accounts for the loopback delay, and is designed to accommodate the size of each data buffer. In one embodiment, the size of each data buffer in the PCM interface driver is 32768 bytes; filling and reading the first data buffer takes 1.024 seconds (16 kHz sampling rate, 16 bits per sample). The number of delay samples thus ensures that samples of the input waveform corresponding to actual frequency data are not included in the loopback. Synchronization of the playback and record waveforms accordingly takes over 1 second for each phone line measurement.

Other techniques can be used to establish synchronization. For example, instead of waiting until an entire data buffer fills before reading the data buffer, the processor can read samples as they return from the codec. In that instance, a smaller number than 16640 of loopback delay samples can be built into the input waveform, which would provide less delay before synchronization with actual frequency data.

With the loopback mode disabled, the SLIC 28 subsequently sends (step 218) the input audio signal onto the phone line 12 to begin measurement of the resulting current associated with each individual transmitted frequency (e.g., 62.5 Hz and 125 Hz). The processor subsequently captures data associated with the SLIC current measurement.

After the data has been captured, the processor analyzes (step 220) the loopback data to determine (step 220) the number of offset samples in the digital loop between the processor 60 and the subscriber line interface module 16 (i.e., the sample delay between when the first sample of the loopback data is transmitted over the transmit path to when subsequently received on the receive path). Using this offset number of samples (and prior knowledge of the padding of samples put around each frequency in the generated source waveform), the R/C measurement application 68 finds (step 222), in the data buffers, the first A/D sample of the response data for each frequency, parses through and averages (step 224) the data into a single one-cycle waveform at that frequency.

For example, the 16000 samples of 62.5 Hz data corresponds to 125 complete cycles in two seconds. Each cycle has 128 samples. Averaging the data into a single one-cycle waveform entails producing a first sample of the one-cycle waveform by averaging the first samples of the 125 cycles, producing a second sample of the one-cycle waveform by averaging the second samples of the 125 cycles, and so on, until the 128th sample of the one-cycle waveform is produced by averaging the 128th samples of the 125 cycles. This averaging serves to increase resolution and reduce noise in the received measurement signal. Other embodiments can use longer or shorter waveforms for each frequency than 2 seconds. Waveforms shorter than 2 seconds can reduce measurement time, with a possible tradeoff in resolution and noise.

From this one-cycle waveform, the R/C measurement application 68 determines (step 226) the in-phase (real) and out-of-phase (imaginary) components of each frequency. This determination can be made through the use of a fast Fourier Transform (FFT) or, instead of an FFT, a compile-time option using a dot-product for this calculation. The R/C measurement application 68 then passes the real and imaginary components of each frequency into the 3-port model program code 78, to calculate (step 228) the resistance and capacitance of the phone line 12.

The 3-port model program code 78 is used because the internal characteristics of the subscriber line interface module (i.e., codec, SLIC, and other components) are generally unknown, and introduce gain and phase changes across frequencies. To take into account (i.e., cancel out) these unknown internal characteristics when characterizing twisted pair wiring, in one embodiment, calibration parameters are computed specifically for the subscriber line interface module using different calibration resistors of known values. Instead of on a circuit board-by-board basis, in other embodiments, computation of calibration parameters occurs on a system design basis or on a lot-by-lot (a set of circuit boards) basis.

Computation of the calibration parameters for input to the 3-port model uses standard off-the-shelf resistors. An example of a process for generating calibration parameters includes: (1) picking three or more resistors that adequately cover the desired range of measurement; (2) measuring each resistor with multiple digital voltmeters and average the results to obtain an precise value of each resistor; and (3) placing each resistor across the tip and ring and initiating a measurement sequence at the same frequencies that will be used in an actual line measurement.

Evaluations of calibration resistors over frequency ranges (62.5 Hz-2 kHz) can produce calibration parameters that drift from ideal curves as measurement frequencies are increased. The drift increases for measurement frequencies that are greater than or equal to 1000 Hz. Measurements made at frequencies less than or equal to 62.5 Hz can make the test system susceptible to external AC noise. In addition, harmonics of frequency sources (greater than or equal to 500 Hz) increase at increasing gain levels. Further, frequencies that are an even divisor of 2 of the 16000 kHz sampling frequency produce periodic phase information. Taking these factors into consideration, the measurement frequencies used to characterize the twisted pair wiring are preferably greater than 62.5 Hz and less than 500 Hz in order to achieve optimum performance without limiting dynamic range; preferred specific frequencies include 125 Hz and 250 Hz.

For each resistor, the real and imaginary outputs of the FFT (or dot-product) computation at each frequency are saved to a file. From the data stored in this file, calibration parameters (A, B, C) for the 3-port model are computed and written to the calibration data file 80. An example of using a 3-port model for computing calibration parameters is described in U.S. Pat. No. 6,842,012, issued Jan. 11, 2005, titled "Modeling and Calibrating a Three-Port Time-Domain Reflectometry System", the entirety of which patent is incorporated by reference herein. With these calibration parameters, the resistance and capacitance of an unknown load (i.e., the twisted pair wiring under test) can be computed.

Solving for the resistance and capacitance using a predetermined 3-port linear model of the system assumes a load comprised of a resistor in parallel with a capacitor. A standard formula for a linear 3-port model is:

$$H = (A*Z+B)/(C*Z+1) \tag{Eq. 1}$$

where H is the measurement at frequency w=2πf, and A, B, and C are three-port linear model constants of the system. The values for A, B, and C are derived from the calibration resistors, which can be statically defined in the R/C measurement application 68 or read in by the R/C measurement application 68 from the calibration data file.

Solving for the impedance on the line:

$$Z = (B-H)/(H*C-A) \tag{Eq. 2}$$

The load impedance Z is therefore:

$$Z = r/(1+j*w*r*c) \tag{Eq. 3}$$

Substituting Z in Eq. 2 into Z in Eq. 3:

$$r*(H*C-A)+r*c*j*w*(H-B) = (B-H) \tag{Eq. 4}$$

Defining a variable u=r*c and substituting gives the following equation:

$$r*(H*C-A)+u*j*w*(H-B) = (B-H) \tag{Eq. 5}$$

Equation 5 is for a measurement at a particular frequency. If N measurements are taken, with each measurement at a different frequency, then there are N equations (Equation 5) with a different H and w for each equation. Because equation 5 has 2 unknowns, the value of N needs to be greater than or equal to 2 in order to obtain a solution. These N equations can be written in matrix form as: M*X=P, where X is a 2-by-1 column vector consisting of the variables to be solved for (r and u):

$$X = \begin{bmatrix} r \\ u \end{bmatrix}$$

P is an N-by-1 vector:

$$P = \begin{bmatrix} (B-H1) \\ (B-H2) \\ ... \end{bmatrix}$$

and M is an N-by-2 matrix:

$$M = \begin{bmatrix} (H1*C-A) & j*w1*(H1-B) \\ (H2*C-A) & j*w2*(H2-B) \\ ... & ... \end{bmatrix}$$

To solve for r and u, the above matrix equation is solved for the best least-squares fit of X: X=inverse(M'*M)*M'*P. After r and u are found, then c can be determined as follows:

$$c = u/r.$$

The above equations assume that the N equations are sufficiently linearly independent and that the matrices do not emphasize nonlinearities.

The resistance and capacitance measurements described above are 2-terminal measurements taken across Tip-Ring, Tip-Ground, or Ring-Ground. These measurements are "composite" measurements, because the results for each 2-terminal measurement include the affects of all capacitors and resistors on the phone line. The independent values of the resistors/capacitors across Tip-Ring, Tip-Ground, or Ring-Ground are "component" values. The equations that relate component values to composite measurements are as follows:

$R_{TRC} = R_{TR} \| (R_{TG} + R_{RG})$; the composite tip-ring resistance is equal the component tip-ring resistance in parallel with the sum of the component tip-ground resistance and component ring-ground resistance.

RTGC=RTG∥(RTR+RRG); the composite tip-ground resistance is equal the component tip-ground resistance in parallel with the sum of the component tip-ring resistance and component ring-ground resistance.

RRGC=RRG∥(RTR+RTG); the composite ring-ground resistance is equal the component ring-ground resistance in parallel with the sum of the component tip-ring resistance and component tip-ground resistance.

CTRC=CTR+(CTG∥CRG); the composite tip-ring capacitance is equal the component tip-ring capacitance in parallel with the sum of the component tip-ground capacitance and component ring-ground capacitance.

CTGC=CTG+(CTR∥CRG); the composite tip-ground capacitance is equal the component tip-ground capacitance in parallel with the sum of the component tip-ring capacitance and component ring-ground capacitance CRGC=CRG+(CTR∥CTG); the composite ring-ground capacitance is equal the component ring-ground capacitance in parallel with the sum of the component tip-ring capacitance and component tip-ground capacitance.

The above sets of equations may be solved to determine the component values given the composite measurements.

To perform resistance and capacitance measurements, the R/C measurement application 68 calls the play/record application code 70 to establish a playback and record session. The play/record application code 70 includes program code for spawning playback threads and record threads.

Figure 5:
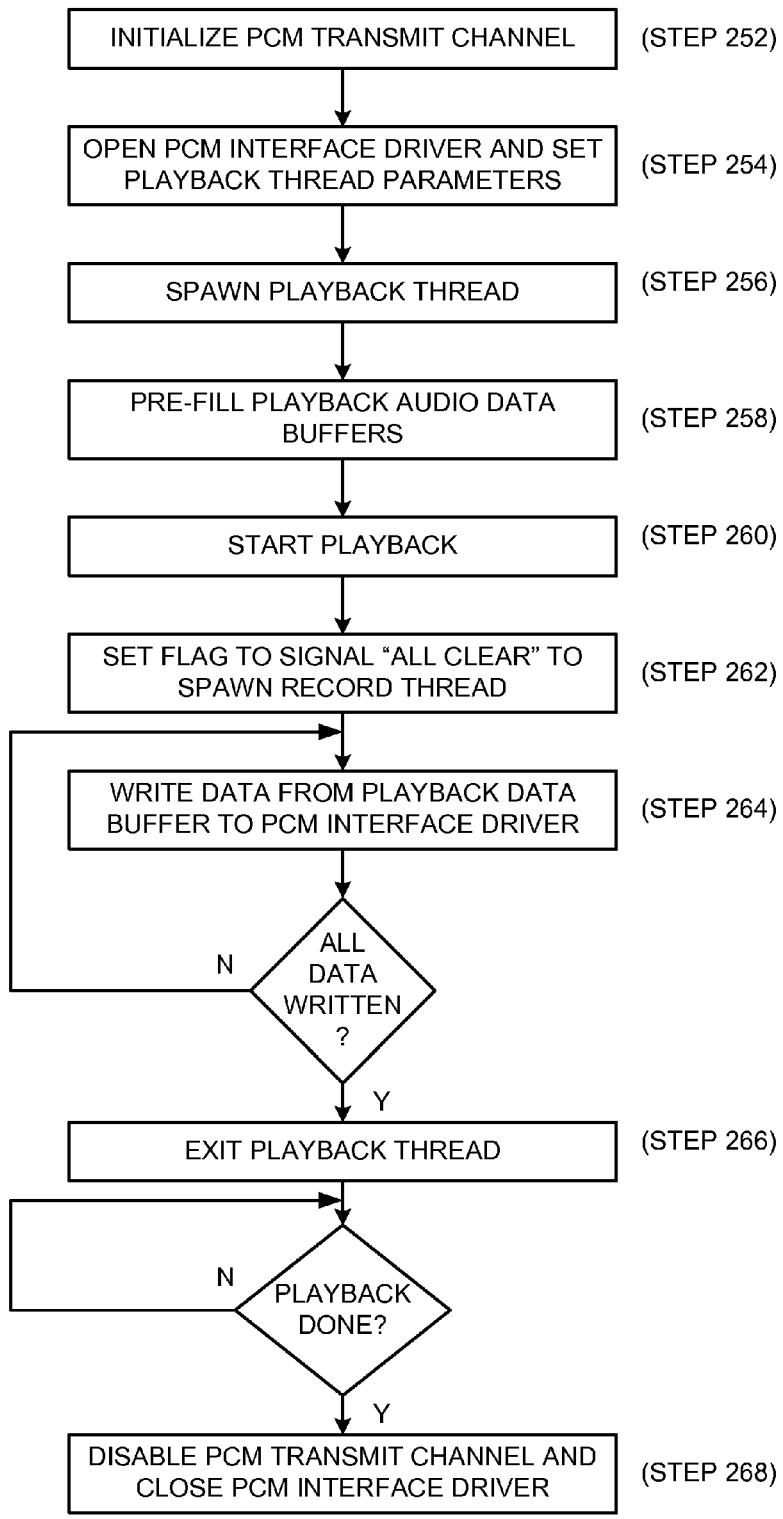
FIG. 5 is a flow diagram of an embodiment of a process for playing out a PCM data stream.

FIG. 5 shows an embodiment of a process 250 for generating a playback thread in order to play out an audio file from the system processor to the subscriber line interface module 16. At step 252, the PCM transmit channel is initialized. In addition, the audio format and sampling rate of the subscriber line interface module are set. The play/record application code 70 opens (step 254) the PCM interface driver 72 (described below) in play mode and sets the parameters of the playback thread. The thread parameters include a file descriptor of the calling function, the file size (in bytes) of the audio file to be played out, a pointer to a local scratch buffer (e.g., 2048 words in size), a handle of the audio file to be played out, a sampling rate of the audio file to be played out, and the number of bits per sample of the audio file to be played out. The PCM interface driver 72 spawns (step 256) the playback thread with these parameters.

After being spawned, the playback thread continually writes (step 258) data to playback data buffers until the playback thread receives a returns status of SUCCESS PLAYBACK STARTED. This pre-filling of all playback data buffers limits the possibility of an underrun condition, in which the PCM interface driver 72 runs out of data because the play/record application 70 cannot provide data in time. The PCM interface driver 72 starts (step 260) the audio playback after all of the playback data buffers are full, or the PCM interface driver has received all of the data to be played for this session.

The playback thread can be used for a synchronous playback and record session. After playback has started, a flag is set (step 262) to indicate to the calling function that a record thread can now be spawned. This sequencing prevents the record thread from blocking the playback thread during the pre-fill of the playback audio buffers.

After playback has started, the playback thread continues (step 264) to write data to the PCM interface driver 72 until all of the data of the audio file has been sent. After each write operation, the playback thread sleeps (e.g., for 100 us) to allow the processor 60 to service other threads. The playback thread exits (step 266) after all of the data have been sent to the PCM interface driver 72.

After the playback thread exits, the calling function that created the playback thread spins and waits until the calling function receives a message from the PCM interface driver that playback is complete. After receiving this message, the calling function disables (step 268) the PCM transmit channel and closes the PCM interface driver.

Figure 6:
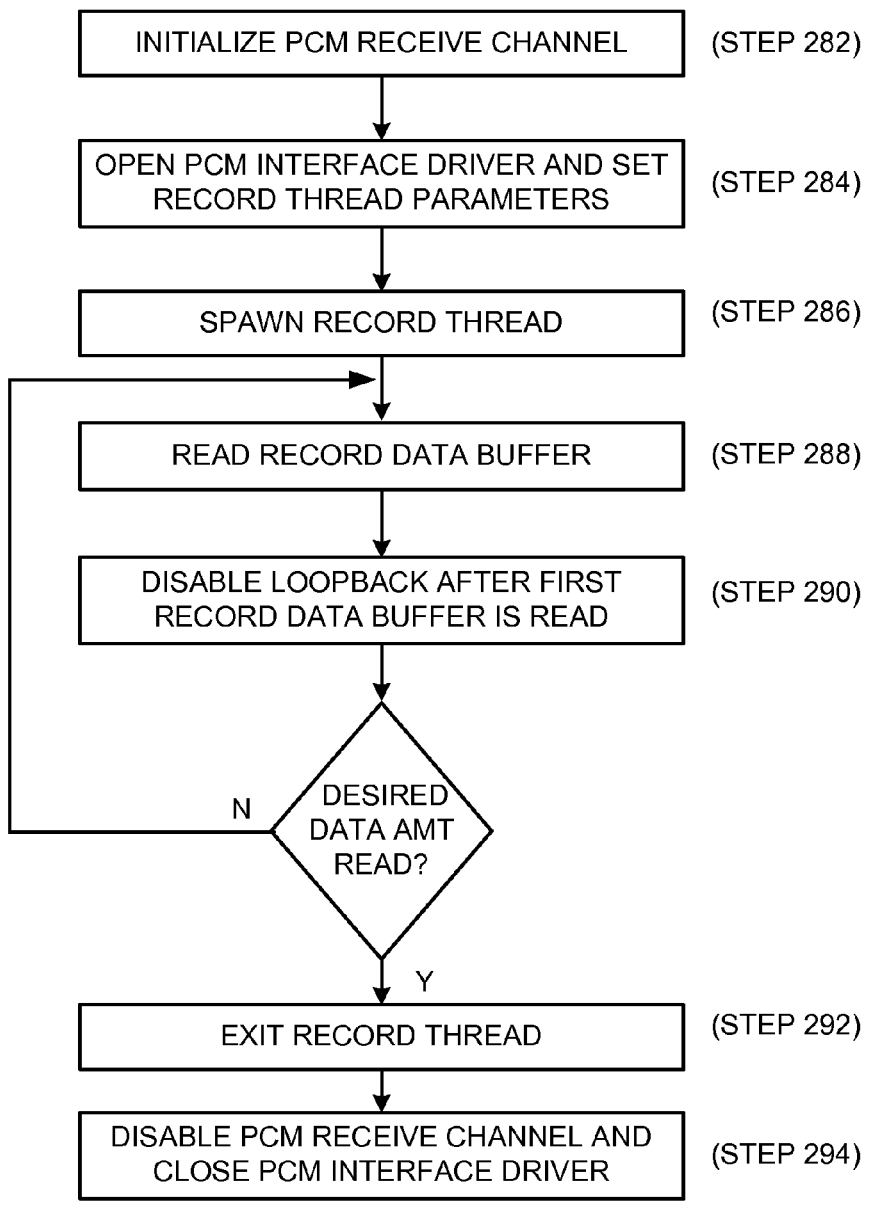
FIG. 6 is a flow diagram of an embodiment of a process for recording a PCM data stream.

FIG. 6 shows an embodiment of a process 280 for recording audio data received through the PCM interface. At step 282, the PCM receive channel is initialized, and the audio format and sampling rate set. The play/record application code opens (step 284) the PCM interface driver in record mode and sets the parameters of the record thread. The thread parameters include a file descriptor of the calling function, a pointer to a buffer (if writing to a file, this pointer is to a local (e.g., 2048 word) scratch buffer, if writing to memory this pointer is to a buffer large enough to hold all of the recorded data), the number of audio samples to record, the size of each audio sample, the sampling rate of the audio file to be recorded, the number of bits per sample of the audio file to be recorded, the endianness of each audio sample, an indicator of whether to write the data to a file or to a data buffer, and a handle of the audio file to record the data (if writing to a file). The PCM interface driver spawns (step 286) the record thread with these parameters.

After being spawned, the record thread continually (step 288) reads data from the record data buffers. After each read operation, the record thread sleeps (e.g., for 100 us) to allow another thread to receive service from the processor. After the first record data buffer is read, the R/C measurement application 68 disables (step 290) the digital loopback mode of the codec 26. The record thread exits (step 292) after the desired amount of data have been read from the PCM interface driver. After the record thread exits, the calling function that created the thread disables (step 294) the PCM receive channel in the SLIC and closes the PCM interface driver.

Figure 7:
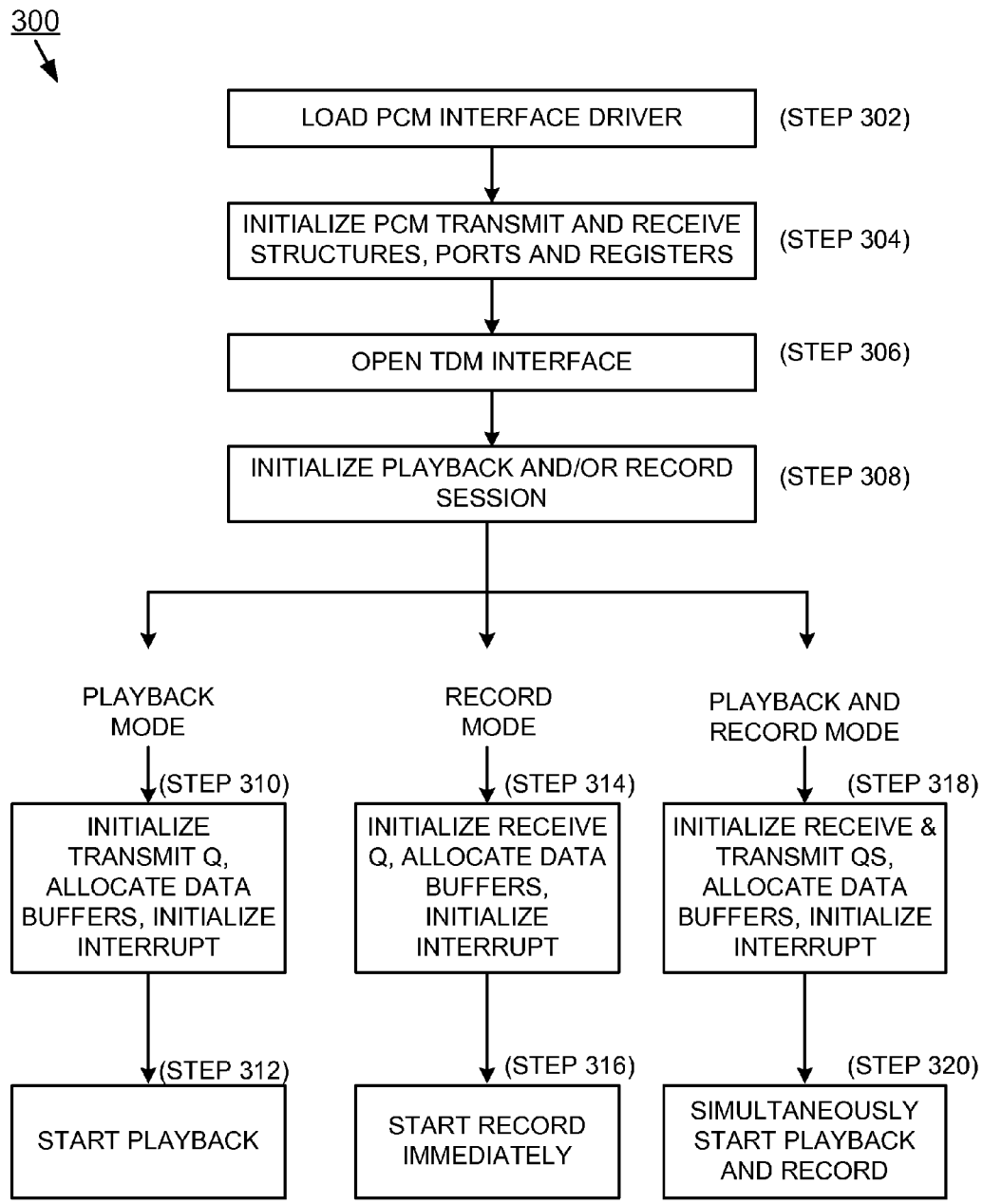
FIG. 7 is a flow diagram of an embodiment of a process for controlling a playback and record session.

To playback an audio file and to record audio data received in response, the play/record application 70 calls the PCM interface driver 72 to control a playback and/or record session. FIG. 7 shows an embodiment of a process 300 for controlling a playback and record session using the PCM interface driver 72. At step 302, the PCM interface driver is loaded into RAM, and the PCM transmit and receive data structures are initialized. After opening the PCM interface driver, the PCM port pins are configured (step 304) to perform their particular functions as a TDM interface; a TDM register and the appropriate peripheral register (e.g., SMC1) are initialized.

When starting a playback and/or record session, the PCM interface play/record application 70 opens (step 306) the TDM interface 66 of the processor 60 and passes (step 308) a list of parameters to the session. The parameters for initializing the session include the mode of the session (i.e., playback, record, or simultaneous playback and record), the number of blocks of data to transfer through the TDM interface, the sample rate of the transferred data, the size in bytes of each block of transferred data, and the endianness of the transferred data.

At step 310, in response to opening the TDM interface in playback mode, the transmit queue is initialized, four playback data buffers (e.g., 32K each) are allocated for storing data to be played out, and a corresponding interrupt (e.g., SMC IRQ) is initialized. The start of playback occurs (step 312) with an initial write of data stored in the data buffers to the TDM interface.

At step 314, in response to opening the TDM interface in record mode, a receive queue is initialized, four record data buffers (e.g., 32K each) are allocated for storing received audio data, and a corresponding interrupt (e.g., SMC IRQ) is initialized. The start of the record session begins immediately and the PCM interface play/record application reads (step 316) the data stored in the record data buffers with each subsequent call to read from the TDM interface.

In response to opening the TDM interface in simultaneous playback and record mode, at step 318, both the transmit queue and the receive queue are initialized, 4 buffers (32K) are allocated for both data playback and record, and a corresponding interrupt is initialized. The start of the record session is held off so the playback and record occur in synchronization. The simultaneous playback and record session starts (step 320) during a subsequent call to write to the TDM interface.

After playback begins, data are continuously transferred from the play/record application 70 to the PCM interface driver and out to the SLIC 28 through the TDM interface. The play/record application 70 keeps the transmit data buffers filled (so that an underrun condition does not occur) by passing data to the PCM interface driver. After the play/record application 70 fills the playback data buffers, a subsequent write waits for a buffer to free up. When a data buffer fills, the block-write-pointer of the transmit queue is incremented (and wrapped if necessary).

In one embodiment, four 32K buffers are allocated for each playback session and after the data in one buffer has been played out, data automatically starts playing from the next non-empty buffer and an interrupt (e.g., SMC1) is generated. An interrupt service routine checks whether all of the data has been played, and if so, an asynchronous message is sent to the play/record application 70. If all of the data has not been played, then the data transfer size is decremented and the block-read-pointer of the transmit queue is incremented (and wrapped if necessary).

After record begins, data is continuously transferred from the subscriber line interface module through the PCM interface driver to the play/record application 70. The play/record application 70 keeps driver data from being overrun (or dropped) by reading data from the record data buffers. After the record data buffers have been emptied by the play/record application 70, a subsequent read waits for a record data buffer to fill up. Each time a record data buffer is read by the play/record application 70, the block-read-pointer to the receive queue is incremented (and wrapped if necessary).

In one embodiment, four 32K data buffers are allocated for each record session. After a data buffer has been filled with recorded data, data automatically starts filling into the next empty data buffer and an interrupt (e.g., SMC1) is generated. A corresponding interrupt service routine increments the block-write-pointer to the receive queue (and wrapped if necessary).

After the desired amount of data has been completely transferred to (or recorded from) the subscriber line interface module, the play/record application 70 closes the TDM interface, frees all allocated data buffers, and releases the (e.g., SMC1) interrupt.

The above-described methods and systems and can be implemented in a software module, a software and/or hardware testing module, a telecommunications test device, a DSL modem, an ADSL modem, an xDSL modem, a VDSL modem, a linecard, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: xDSL, CDSL, ADSL2, ADSL2+, VDSL1, VDSL2, HDSL, DSL Lite, IDSL, RADSL, SDSL, UDSL, or the like.

Additionally, the systems, methods and protocols of this invention can be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to this invention.

As will be appreciated by one skilled in the art, aspects of the present invention may be embodied as a system, method, or computer program product. Accordingly, aspects of the present invention may take the form of an entirely hardware embodiment (e.g., standard logic circuits or VLSI design), an entirely software embodiment (including firmware, resident software, micro-code, etc.) or an embodiment combining software and hardware aspects. All such forms may be generally referred to herein as a "system". Furthermore, aspects of the present invention may take the form of a computer program product embodied in one or more computer readable storage medium(s) having computer readable program code embodied thereon.

A computer readable storage medium may be any tangible medium that can contain, or store a program for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium include, but are not limited to, the following: a portable computer diskette, a hard disk, a random access memory (RAM), a read-only memory (ROM), an erasable programmable read-only memory (EEPROM, EPROM, Flash memory), an optical fiber, a portable compact disc read-only memory (CD-ROM), an optical storage device, a magnetic storage device, or any suitable combination of the foregoing. Program code embodied on a computer readable storage medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java®, CGI script, Smalltalk, C++ or the like and conventional procedural programming languages, such as the "C" programming language or similar programming languages.

Aspects of the present invention are described herein with reference to flowchart illustrations and block diagrams of methods, apparatus (systems), and computer program products in accordance with embodiments of the invention. Each block of the flowchart illustrations and block diagrams, and combinations of blocks in the flowchart illustrations and block diagrams can be implemented by computer program instructions.

Computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions, acts, or operations specified in the flowchart and block diagram block. Computer program instructions may also be stored in a computer readable storage medium that can direct a computer, other programmable data processing apparatus, or other devices to function in a particular manner, such that the instructions stored in the computer readable medium produce an article of manufacture including instructions which implement the function, act, or operation specified in the flowchart and block diagram block.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions, acts, or operations specified in the flowchart or diagram block.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of program code, which comprises one or more executable instructions for implementing the specified logical function(s). The functions noted in the blocks may occur out of the order noted in the FIGS. For example, two blocks shown in succession may be executed substantially concurrently, or the blocks may sometimes be executed in the reverse order, depending upon the functionality involved. In addition, each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While one or more example embodiments described herein discuss various components of the system as being collocated, it should be appreciated that various components may be located separately (e.g., at distant portions of a distributed network, such as a telecommunications network and/or the Internet or within a dedicated communications network). Thus, it should be appreciated that various components of the system may be combined into one or more devices or collocated on a particular node of a distributed network, such as a telecommunications network.

While the invention has been shown and described with reference to specific example embodiments, it should be appreciated that individual aspects of the invention can be separately claimed and one or more of the features of the various embodiments can be combined. In addition, it should be understood by those skilled in the art that various changes in form and detail may be made therein without departing from the spirit and scope of the invention as defined by the following claims.

What is claimed is:

1. A method for diagnosing twisted pair wiring, comprising:
    converting an input waveform comprised of digital audio data into an analog audio signal having a frequency less than or equal to 20 kHz;
    transmitting the analog audio signal onto twisted pair wiring;
    sensing current in response to transmitting the analog audio signal over the twisted pair wiring;
    generating, from an analog signal corresponding to the sensed current, a digital output waveform comprised of delay samples and measurement data produced in response to the frequency;
    identifying where the measurement data appears in the digital output waveform by enabling loopback mode, determining a sample delay from when a given sample is transmitted in the loopback mode and when the given sample is received, and synchronizing the input waveform and the output waveform at a single analog/digital (A/D) sample using the sample delay; and
    determining, in response to identifying where the measurement data appears in the digital output waveform, electrical properties of the twisted pair wiring from the measurement data in the digital output waveform.

2. The method of claim 1, further comprising removing from the analog signal corresponding to the sensed current at least one signal having a frequency other than the frequency of the transmitted analog audio signal.

3. The method of claim 1, wherein determining the electrical properties of the twisted pair wiring from the output waveform includes determining phase information from the output waveform and computing a resistance and capacitance of the twisted pair wiring based on the phase information.

4. The method of claim 3, wherein computing a resistance and capacitance of the twisted pair wiring includes passing the phase information to a 3-port model of system components.

5. The method of claim 1, further comprising:
    transmitting a digital Pulse Code Modulation (PCM) data stream comprising the input waveform from a system processor to a subscriber line interface module; and
    converting the digital PCM data stream into the analog audio signal having a frequency less than or equal to 20 kHz for transmission onto the twisted pair wiring.

6. The method of claim 1, further comprising receiving the output waveform as a digital PCM data stream.

7. The method of claim 1, wherein the analog audio signal having a frequency less than or equal to 20 kHz includes multiple different temporally separated frequencies.

8. The method of claim 1, wherein the analog audio signal having a frequency less than or equal to 20 kHz includes multiple different concurrent frequencies.

9. The method of claim 1, wherein the frequency included in the analog audio signal having a frequency less than or equal to 20 kHz is greater than 62.5 Hz and less than 500 Hz.

10. An apparatus for diagnosing twisted pair wiring, comprising:
 a Subscriber Line Interface Circuit (SLIC) capable of transmitting an analog audio signal having a frequency less than or equal to 20 kHz onto the twisted pair wiring and capable of sensing current on the twisted pair wiring in response to the transmitted analog audio signal;
 a codec having a loopback mode of operation, the codec being capable of converting an input waveform comprised of digital audio data into the analog audio signal and of generating, from an analog signal corresponding to the sensed current, a digital output waveform comprised of delay samples and measurement data produced in response to the frequency; and
 a system processor capable of identifying where the measurement data appears in the digital output waveform by enabling the loopback mode, determining a sample delay from when a given sample is transmitted with the codec in the loopback mode of operation and when the system processor receives the given sample, and synchronizing the input waveform and the digital output waveform at a single analog/digital (A/D) sample using the sample delay, the system processor being further capable of determining, in response to identifying where the measurement data appears in the digital output waveform, electrical properties of the twisted pair wiring from the measurement data in the digital output waveform.

11. The apparatus of claim 10, further comprising a lock-in amplifier capable of removing from the analog signal corresponding to the sensed current at least one signal having a frequency other than the frequency of the transmitted analog audio signal.

12. The apparatus of claim 10, wherein the system processor is capable of determining phase information and amplitude from the output waveform and computes a resistance and capacitance of the twisted pair wiring based on the phase information and amplitude.

13. The apparatus of claim 12, further comprising a 3-port model of system components including the codec and SLIC, and wherein the system processor is capable of passing the phase information to the 3-port model when computing the resistance and capacitance of the twisted pair wiring.

14. The apparatus of claim 10, wherein the system processor is capable of transmitting a digital Pulse Code Modulation (PCM) stream to the codec, and the codec is capable of converting the digital PCM stream into the analog audio signal transmitted by the SLIC onto the twisted pair wiring.

15. The apparatus of claim 10, wherein the system processor is capable of receiving the output waveform from the codec as a digital Pulse Code Modulation (PCM) data stream.

16. The apparatus of claim 10, wherein the analog audio signal transmitted onto the twisted pair wiring includes multiple different temporally separated frequencies.

17. The apparatus of claim 10, wherein the analog audio signal transmitted onto the twisted pair wiring includes multiple different concurrent frequencies.

18. The apparatus of claim 10, wherein the frequency included in the transmitted analog audio signal is greater than 62.5 Hz and less than 500 Hz.

19. An apparatus for diagnosing twisted pair wiring, comprising:
 a codec having a loopback mode of operation, the codec being capable of converting digital audio data into a sinusoidal audio signal;
 a transmitter capable of sending the sinusoidal audio signal onto twisted pair wiring;
 a receiver capable of generating a sinusoidal output signal corresponding to current sensed in response to transmitting the sinusoidal audio signal over the twisted pair wiring;
 the codec further being capable of digitizing the sinusoidal output signal corresponding to sensed current to produce a digital output signal comprised of delay samples followed by measurement data; and
 a processor capable of identifying where the measurement data appears in the digital output signal by enabling the loopback mode, determining a sample delay from when a given sample is transmitted with the codec in the loopback mode of operation and when the processor receives the given sample, and synchronizing the input waveform and the digital output waveform at a single analog/digital (A/D) sample using the sample delay, the processor being further capable of determining, in response to identifying where the measurement data appears in the digital output signal, resistance and capacitance of the twisted pair wiring based on the measurement data in the digital output signal.

* * * * *